(12) United States Patent
Chen et al.

(10) Patent No.: US 6,826,047 B1
(45) Date of Patent: Nov. 30, 2004

(54) COOL AIR-SUPPLYING DEVICE FOR A COMPUTER SYSTEM

(75) Inventors: Yu Chen, Taipei (TW); Wen-Shiang Hung, Taipei Hsien (TW); Chih-Hsien Chen, Taipei (TW); Young-Kwang Sheu, Tao-Yuan Hsien (TW)

(73) Assignee: Uniwill Computer Corporation, Chung-Li (TW)

( * ) Notice: Subject to any disclaimer, the term of this patent is extended or adjusted under 35 U.S.C. 154(b) by 0 days.

(21) Appl. No.: 10/249,891

(22) Filed: May 15, 2003

(51) Int. Cl.[7] .................................................. H05K 7/20
(52) U.S. Cl. ........................ 361/687; 361/686; 361/695; 361/690; 62/3.7; 165/185
(58) Field of Search .................. 361/683, 686, 361/687, 688, 692, 695, 714–722; 174/15.2, 16.1, 16.3; 257/712–727; 62/3.2, 3.7, 259.2, 332, 340, 429, 3.62; 165/104.21, 104.33, 80.3; 136/212, 225, 230; 395/281, 283, 750.08, 750.01, 700, 750.06

(56) References Cited

U.S. PATENT DOCUMENTS

| | | | | |
|---|---|---|---|---|
| 5,946,188 A | * | 8/1999 | Rochel et al. | 361/690 |
| 6,055,814 A | * | 5/2000 | Song | 62/3.2 |
| 6,094,347 A | * | 7/2000 | Bhatia | 361/695 |
| 6,109,039 A | * | 8/2000 | Hougham et al. | 62/3.7 |
| 6,215,660 B1 | * | 4/2001 | Lin | 361/695 |
| 6,276,448 B1 | * | 8/2001 | Maruno | 165/185 |
| 6,353,536 B1 | * | 3/2002 | Nakamura et al. | 361/686 |
| 6,415,612 B1 | * | 7/2002 | Pokharna et al. | 62/3.2 |
| 6,522,535 B1 | | 2/2003 | Helot et al. | |
| 6,542,361 B2 | * | 4/2003 | Paradis | 361/687 |
| 6,567,262 B2 | * | 5/2003 | Meir | 361/676 |
| 6,646,874 B2 | * | 11/2003 | Pokharna et al. | 361/687 |
| 2002/0141152 A1 | | 10/2002 | Pokharna et al. | |
| 2002/0186531 A1 | | 12/2002 | Pokharna et al. | |
| 2003/0005201 A1 | | 1/2003 | Olson et al. | |

FOREIGN PATENT DOCUMENTS

| | | | | |
|---|---|---|---|---|
| JP | 410054624 A | * | 2/1998 | F25B/21/02 |
| JP | 2000165007 | | 6/2000 | |
| JP | 020001655077 A | * | 6/2000 | H05K/7/20 |

OTHER PUBLICATIONS

A Method of system cooling for hand held device; ISSN:0374–4353.

* cited by examiner

Primary Examiner—Michael Datskovsky
(74) Attorney, Agent, or Firm—Winston Hsu (57) ABSTRACT

A cool air-supplying device for a computer system. The computer system includes a computer apparatus and the computer apparatus includes a housing. The cool air-supplying device includes a casing connected to the housing of the computer system. The casing has an intake vent for receiving air and an outlet vent for outputting air. The cool air-supplying device further includes a thermoelectric cooler for cooling refrigerant within a heat pipe, the heat pipe installed inside the casing for transferring refrigerant cooled by the thermoelectric cooler to the outlet vent. A first fan installed at one end of the heat pipe transfers air cooled by the heat pipe to the housing of the computer system via the outlet vent.

6 Claims, 9 Drawing Sheets

COOL AIR-SUPPLYING DEVICE FOR A COMPUTER SYSTEM

BACKGROUND OF INVENTION

1. Field of the Invention

The present invention relates to a cool air-supplying device for a computer system, and more particularly, to a cool air-supplying device that cools air using a thermoelectric cooler.

2. Description of the Prior Art

With the rapid development of information technology, computer systems are playing an important role in modernizing many companies and are now widely used in practically every industry. Due to the increase in data storage density, the improvement in operational speed, and the decrease in production costs, the manufacturing of portable computers has become a mainstream business in the computer industry.

When designing portable computers, dissipating unwanted heat is one of the most important problems to consider. In general, the source of most of the heat is the central processing unit (CPU). For this reason, heat dissipation systems in portable computers are mainly designed to expel the heat generated by the CPU. Along with improvements in system performance, increasing the operational speed of the CPU also increases the temperature of the PC components and the computer system. A poorly designed heat dissipation system may render the computer unstable at high temperatures and could even cause physical injury to users.

There are many methods for heat dissipation used on various portable computers and mobile communication devices. However, these prior solutions cannot be used to dissipate the ever increasing heat resulting from increases in the CPU speed and related components. Many new thermal technologies have come out to try and solve this problem. For example, Hitachi applies a water-cooled system for notebooks instead of the traditionalfan based air-cooling methods. But there are still many problems with the water-cooled system, including the weight, size, reliability of the water pipe, risk of water leaking, etc. Because traditional air-cooling methods used alone are not practical to provide a better thermal solution and applying a totally new thermal solution is problematic, using an air-cooling system combined with an additional heat dissipation device is the best choice.

Embedding an additional heat dissipation device requires enough space for dissipating heat and causes increased weight, size, and power consumption. This disobeys the developing trend of mobile devices which tend to be thin and light. A heat dissipation device outside the mobile device can avoid this limitation and yet achieve the required heat dissipation. Taiwan Patent Number 432274 shows a heat dissipation device docking to a mobile computer and includes a thermal pad for transferring heat from the computer system to the heat dissipation device by thermal conduction where the heat is then dissipated. But this prior art has defects of the contact problem, the pad material and structural problem, and the material fatigue problem. In addition, Taiwan Patent Number 493857 discloses a heat dissipation device including several fans for expelling heat from a notebook. But this prior art is limited to sucking air from the bottom case for cooling the bottom case directly but not the hot component, which leads to inefficient cooling design, and tends to be noisy to the discomfort of the user.

SUMMARY OF INVENTION

It is therefore a primary objective of the claimed Invention to provide a cool air-supplying device for a computer system to solve the above-mentioned problems.

According to the claimed invention, a cool air-supplying device for a computer system is disclosed. The computer system includes a computer apparatus and the computer apparatus includes a housing. The cool air-supplying device includes a casing connected to the housing of the computer system and the casing has an intake vent for receiving air and an outlet vent for outputting air. The cool air-supplying device further includes a thermoelectric cooler for cooling refrigerant within a heat pipe, the heat pipe installed inside the casing for transferring refrigerant cooled by the thermoelectric cooler to the outlet vent, and a first fan installed at one end of the heat pipe for transferring air cooled by the heat pipe to the housing of the computer system via the outlet vent.

It is an advantage of the claimed invention that the cool air-supplying device can dissipate more heat from the computer system as a whole and can be separated from the computer system. Users can use the computer with the cool air-supplying device attached while at home or in the office and can separate the cool air-supplying device when In transit. Since current design is a non-contact thermal solution, it does not have the defects the prior art has.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
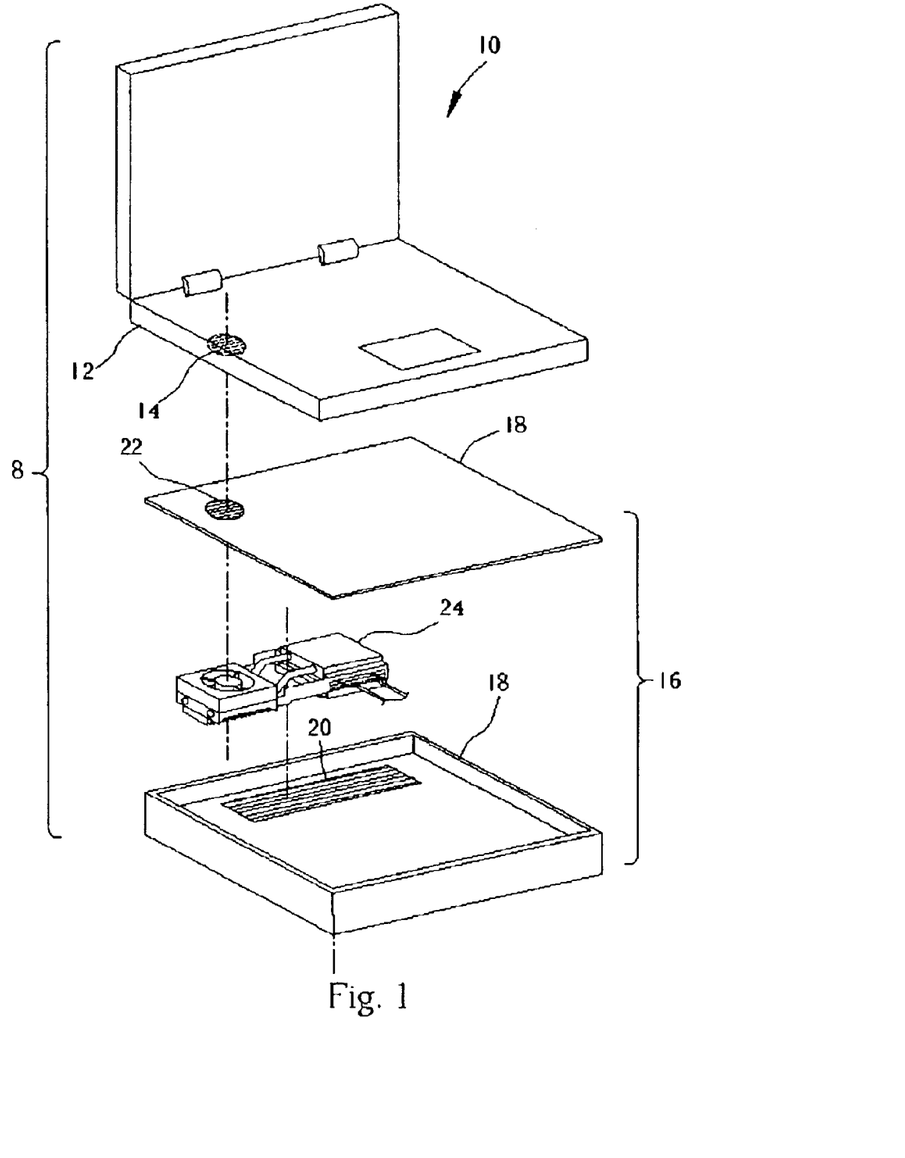
FIG. 1 is an exploded view of a notebook computer system according to the present invention.
Figure 2:
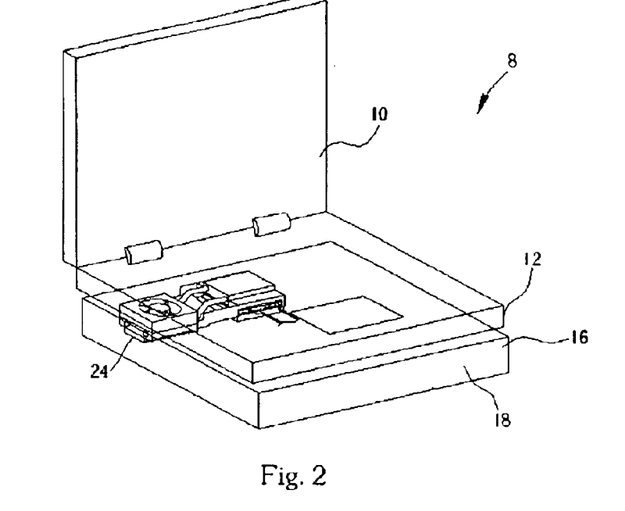
FIG. 2 is a perspective view of the notebook computer system according to the present invention.
Figure 3:
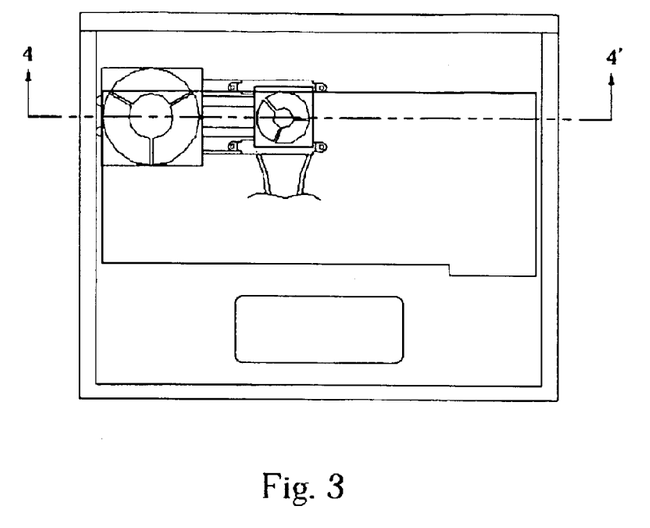
FIG. 3 is a top view of the notebook computer system according to the present invention.
Figure 4:
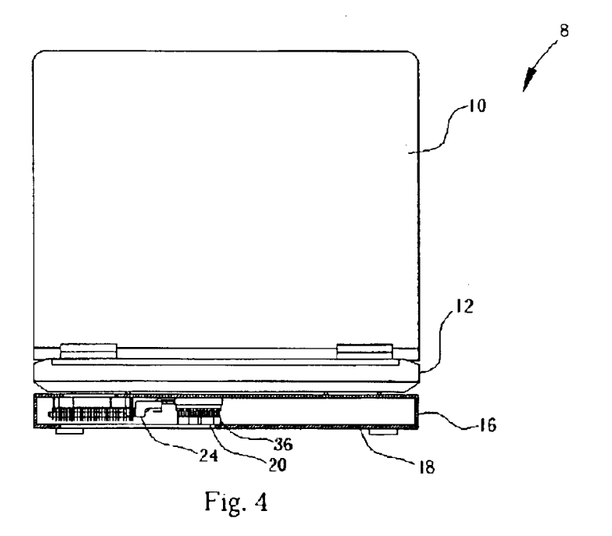
FIG. 4 is a cross-sectional view of the notebook computer system along the line 4—4 in FIG.3.

Please refer to FIG. 1, FIG. 2, FIG. 3, and FIG. 4. FIG. 1 is an exploded diagram of a notebook computer system 8 according to the present invention. FIG. 2 is a perspective diagram of the notebook computer system 8 according to the present invention. FIG. 3 is a top view of the notebook computer system 8 according to the present invention. FIG. 4 is a cross-sectional view of the notebook computer system 8 along the line 4—4 in FIG. 3. In FIG. 1 the notebook computer system 8 includes a notebook computer apparatus 10, and the notebook computer apparatus 10 includes a housing 12. A first intake vent 14 is installed on the housing 12 and is used for air intake to the housing 12. The notebook computer system 8 further includes a cool air-supplying device 16 installed under the housing 12 of the notebook computer apparatus 10. The cool-air supplying device 16 can be located in a different position depending on different first intake vent 14 positions of the notebook computer apparatus 10. For example, the cool air-supplying device 16 can be located on the back or side of the notebook computer apparatus 10. The following description of the preferred embodiment of the present invention is based on the cool air-supplying device 16 being installed under the housing 12 of the notebook computer apparatus 10. The cool-air supplying device 16 includes a casing 18 with a second intake vent 20 for air intake and an outlet vent 22 installed on the top of the casing 18 for outputting air into the housing 12 of the notebook computer apparatus 10 via the first intake vent 14. The first intake vent 14, which is for inputting cold air from the cool air-supplying device 16 into the housing 12 of the notebook computer apparatus 10, is opposite the outlet vent 22 of the cool air-supplying device 16. The air intake is from the second intake vent 20 of the cool air-supplying device 16 and the air is output via the outlet vent 22. The air convection helps the cool air-supplying device 16 dissipate heat. The cool air-supplying device 16 further includes a cooling module 24 for cooling the air received via the second intake vent 20 and outputting the air via the outlet vent 22. The cool air-supplying device 16 is capable of in-taking external air, cooling the air, and outputting the cooled air into the notebook computer apparatus 10 achieving better heat dissipation by forced convection of cooled air.

Figure 5:
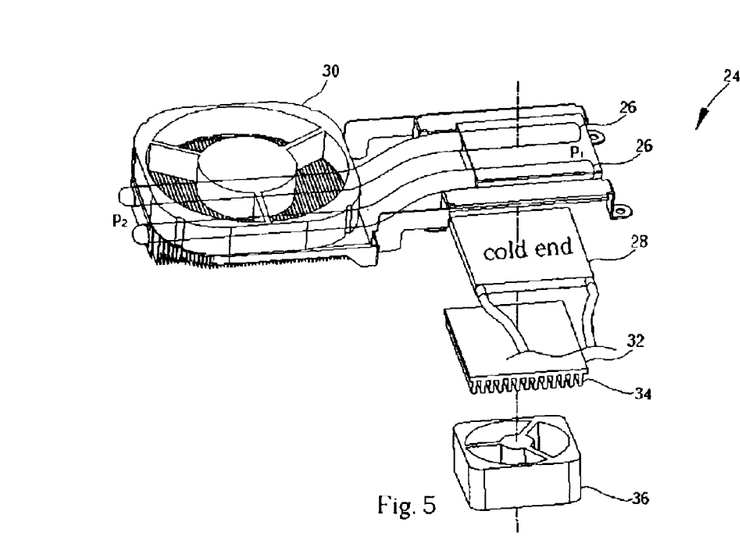
FIG. 5 and FIG. 6 are exploded views of the cooling module in the cool air-supplying device of FIG. 1.
Figure 6:
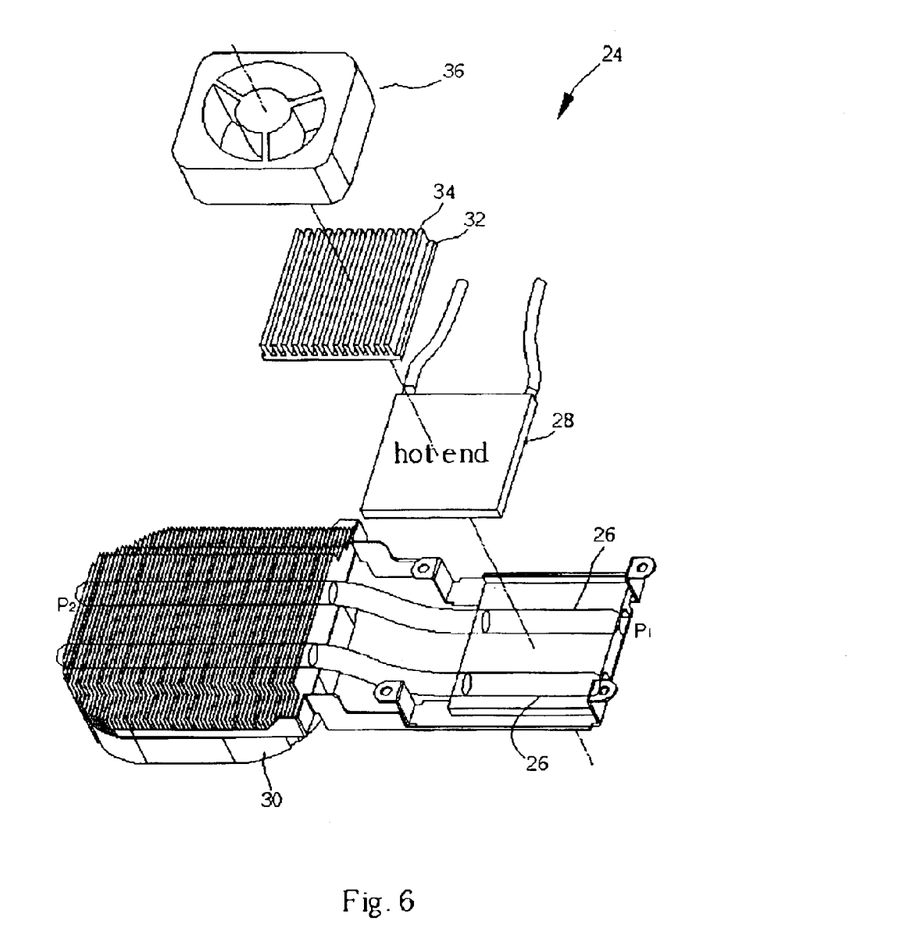

Please refer to FIG. 5 and FIG. 6. FIG. 5 and FIG. 6 are exploded diagrams of the cooling module in the cool air-supplying device. The cooling module 24 includes a thermoelectric cooler 28 for cooling a refrigerant and two heat pipes for transferring the refrigerant cooled by the thermoelectric cooler 28 to the outlet vent 22. A cold end of the thermoelectric cooler 28 is connected to a first end P1 of the heat pipe 26. The cooling module24 further includes a first fan 30 installed at a second end P2 of the heat pipe 26 for transferring the air cooled by the heat pipe 26 into the housing 12 of the notebook computer apparatus 10 via the outlet vent 22. Also included is a heat sink 32 with a plurality of fins 34 for increasing the heat-dissipating area. The heat sink 32 is connected to a hot end of the thermoelectric cooler 28 for dissipating heat from the hot end of the thermoelectric cooler 28. A second fan 36 is installedon heat sink 32 for forcing air to cool down the thermoelectric cooler 28.

The operational principle of the cool air-supplying device 16 is as follows: using the second fan 36 to cool down the heat generated by the thermoelectric cooler 28, transferring the refrigerant cooled by the thermoelectric cooler 28 from the first end P1 to the second end P2 of the heat pipe 26 in order to cool the air around the first fan 30, and using the first fan 30 to output the cooled air via the outlet vent 22 on the top of the casing 18 through the first intake vent 14 on the bottom of the housing 12 and Into the notebook computer apparatus 10. The first intake vent 14 in FIG. 1, which is for inputting air from the cool air-supplying device 16 into the housing 12 of the notebook computer apparatus 10, is opposite the outlet vent 22 of the cool air-supplying device 16 In order to achieve the best heat dissipation by forced convection of cooled air.

Figure 7:
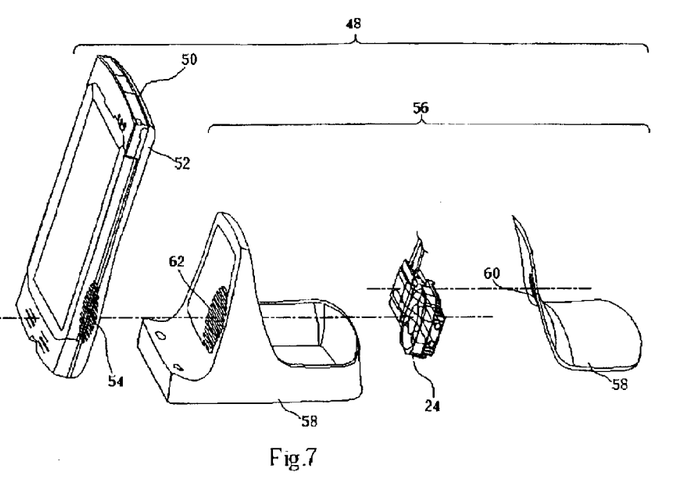
FIG. 7 is a exploded front view of a tablet computer system according to the present invention.
Figure 8:
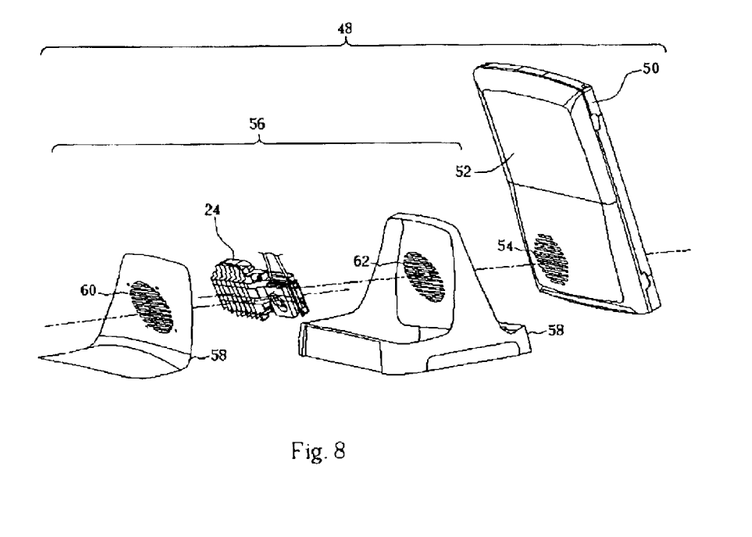
FIG. 8 is a exploded back view of the tablet computer system shown in FIG. 7.
Figure 9:
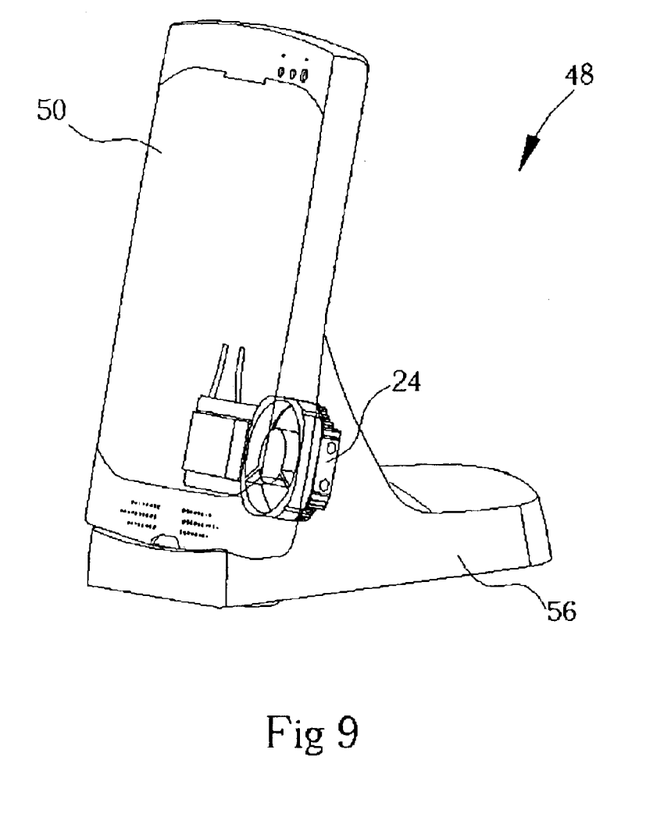
FIG. 9 is a perspective view of the tablet computer system shown in FIG. 7.

Please refer to FIG. 7, FIG. 8, and FIG. 9. FIG. 7 is an exploded front view of a tablet computer system 48. FIG. 8 is an exploded back view of the tablet computer system 48. FIG. 9 is a perspective view of the tablet computer system 48. In FIG. 7 and FIG. 8 the tablet computer system 48 includes a tablet computer apparatus 50, and the tablet computer apparatus 50 includes a housing 52. A first ontake vent 54 is installed on the housing 52 and used for receiving air into the housing 52. The tablet computer apparatus 50 is positioned above a cool air-supplying device 56. Similar to the previous embodiment, the cool air-supplying device 56 could be located in a different position if the first intake vent 54 of the tablet computer apparatus 50 is in a different position. For example, the cool air-supplying device 56 could be located on the back or side of the tablet computer apparatus 50. The following description of the preferred embodiment according to the present invention is based on the cool air-supplying device 56 being installed under the housing 52 of the tablet computer apparatus 50. The cool air-supplying device 56 includes a casing 58 with a second intake vent 60 for air intake and an outlet vent 62 for outputting air into the housing 52 of the tablet computer apparatus 50 via the first intake vent 54. The first intake vent 54, which receives air from the cool air-supplying device 56 into the housing 52 of the tablet computer apparatus 50, is opposite the outlet vent 52 of the cool air-supplying device 56. Air intake is from the second intake vent 60 of the cool air-supplying device 56 and is output via the outlet vent 62. The air convection helps the cool air-supplying device 56 to dissipate the heat. The cool air-supplying device 56 further includes the cooling module 24 for cooling the air received via the second intake vent 60 and outputting the air via the outlet vent 62. The structure and operational principle of the cooling module 24 is the same as previously described and shown in FIG. 5 and FIG. 6.

The operational principle of the cool air-supplying device 56 is similar to the previous embodiment and is described as follows: using the second fan 36 to cool down the heat generated by the thermoelectric cooler 28, transferring the refrigerant cooled by the thermoelectric cooler 28 from the first end P1 to the second end P2 of the heat pipe 26 in order to cool the air around the first fan 30, and using the first fan 30 to output the cooled air via the outlet vent 62 of the casing 58 to the first intake vent 54 of the housing 52 and into the tablet computer apparatus 50. The first intake vent 54 in FIG. 7, which is for inputting air from the cool air-supplying device 56 into the tablet computer apparatus 50, is opposite the outlet vent 62 of the cool air-supplying device 56 to achieve the best heat dissipation by forced convection of cooled air.

In contrast to the prior art, the present invention cool air-supplying device can dissipate more heat from the computer system as a whole than can thermal conduction used alone. In addition, the present invention can be separated from the computer system so that users can use the computer with the cool air-supplying device attached at home or in the office and can separate the cool air-supplying device when in transit.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A cool air-supplying device for a computer system comprising a computer apparatus having a housing, the cool air-supplying device comprising:

a casing connected to the housing of the computer apparatus, the casing comprising an intake vent for receiving air and an outlet vent for outputting air;

a thermoelectric cooler installed inside the casing forcooling a refrigerant;

a heat pipe installed inside the casing for transferring the refrigerant cooled by the thermoelectric cooler to the outlet vent; and a first fan installed at one end of the heat pipe for transferring air cooled by the heat pipe to the housing of the computer system via the outlet vent.

2. The cool air-supplying device of claim 1 further comprising a heat sink connected to a hot end of the thermoelectric cooler for dissipating heat of the hot end of the thermoelectric cooler, and a second fan installed at one end of the heat sink.

3. The cool air-supplying device of claim 2 wherein a plurality of fins are installed on the heat sink.

4. The cool air-supplying device of claim 1 wherein the outlet ventis installed in the casing opposite the intake vent.

5. The cool air-supplying device of claim 1 wherein the computer apparatus is a notebook computer.

6. The cool air-supplying device of claim 1 wherein the computer apparatus is a tablet PC.

* * * * *